United States Patent [19]

Winzeler

[11] Patent Number: 5,240,605
[45] Date of Patent: Aug. 31, 1993

[54] SPIRAL FILTER

[75] Inventor: Heinz B. Winzeler, Winterthur, Switzerland

[73] Assignee: Bioengineering AG, Wald, Switzerland

[21] Appl. No.: 598,686

[22] PCT Filed: Jan. 31, 1990

[86] PCT No.: PCT/CH90/00022
§ 371 Date: Nov. 9, 1990
§ 102(e) Date: Nov. 9, 1990

[87] PCT Pub. No.: WO90/09229
PCT Pub. Date: Aug. 23, 1990

[30] Foreign Application Priority Data

Feb. 18, 1989 [CH] Switzerland .................. 565/89

[51] Int. Cl.[5] .................. B01D 25/19; B01D 25/21
[52] U.S. Cl. .................. 210/228; 210/229; 210/230; 210/231; 210/433.1
[58] Field of Search .......... 210/224, 226, 229, 231, 210/321.76, 335, 343, 346, 433.1, 489, 230

[56] References Cited

U.S. PATENT DOCUMENTS

2,364,366 12/1944 Jahreis .................. 210/299
3,398,834 8/1968 Nuttall et al. .......... 210/346
3,702,659 11/1972 Clark .................. 210/347

Primary Examiner—Matthew O. Savage
Attorney, Agent, or Firm—Johnson & Gibbs

[57] ABSTRACT

A spiral filtering device disposed within a frame consisting of two draw bars and two end pieces. The spiral filter consists of at least one spiral plate and at least two support plates with attached filter plates inserted between two end plates. On each of their plane machined surfaces, the spiral plates have a spiral groove of approximately semicircular cross-section. In addition, each surface of the spiral plate has a round depression with a boss in the shape of the bottom of a bottle. The groove is surrounded by a circular channel which is also recessed. The helicity of both grooves on the surfaces of the spiral plates is the same. The outer ends of the grooves are interconnected by a drilled channel at a shallow angle to the surface of the spiral plate. The inner ends of the grooves are connected to their respective recesses by a drilled channel running substantially parallel to the surface of the spiral plate. With the exception of the channel, the end plates have the same structural characteristics as a side of the spiral plate abutting the respective end plate.

15 Claims, 5 Drawing Sheets

SPIRAL FILTER

FIELD OF THE INVENTION

This invention relates to a filtering device. More particularly, this invention relates to a filtering device in which the material being filtered is introduced on a spiral path. The materials being filtered can be aerosols, liquids and gaseous suspensions, and colloidal or true solutions.

BACKGROUND OF THE INVENTION

A filtering device may be seen by reference to Japanese Patent No. 57,075,113. In the filtering device disclosed therein and in other publications making up the state of the art, the goal of such filtering devices is to avoid impediments to the effectiveness of filtration occurring during the filtration process, and in particular in the ultra-filtration process. Such impediments include the formation of filter cakes, the plugging of filter pores, the formation of gel and salt polarizations, and lowering of the filtering capacity caused by the foregoing impediments. A reduced lowering of the filtering capacity is achieved by employment of high flow rates of the filtered material in directions perpendicular to the filtration direction, which directional employment avoids or at least strongly reduces the formation of layers lowering the filtering capacity. Such a directional employment process is commonly known as "c r 055 flow" filtration.

The known prior art in this regard exhibits a variety of disadvantages. In U.S. Pat. No. 3,702,659 (Swiss Patent No. 625,712) a fluid is filtered by allowing it to flow tangentially against a round filter plate. The velocity of the fluid either increases from the outside to the inside or decreases from the inside to the outside due to the continuity conditions. If the filter plate has enclosed channels through which the fluid flows, the average flow velocity is constant. However, a high flow resistance occurs in the narrow channels. The result of such high flow resistance is a turbulent flow of the fluid. The turbulent flow of the fluid causes high shear forces to occur, resulting in a considerable increase in expended energy. Negative effects on the mixture being filtered can result, particularly when the liquids to be filtered contain either unstable, large molecules or plant or animal cells. Chemical changes in the materials being filtered may even occur. Furthermore, such prior art device is only suitable for one particular filter type which is produced by the manufacturer of the prior art device. Alternatively, other types of filters can be used with such device but only by employing retentive areas and/or complicated perforations within the filter plate.

Most of the known filter devices are installed in their own specialized container. This results in considerable expense in the installation of new filter plates in such specialized containers and in the construction of such specialized containers which can withstand the high pressures necessary for ultrafiltration. Sterilization of such specialized containers can be difficult, due in some instances to the specialized configurations thereof, for example, narrow filtration channels in the container.

It is an object of the present invention to provide a filtering device which overcomes all the above-described disadvantages of the prior art devices and which is easy to handle and can be manufactured at a favorable cost.

SUMMARY OF THE INVENTION

In one aspect, the present invention is a spiral filter for the filtration of aerosols, gaseous and liquid suspensions, and colloidal or true solutions, wherein the material being filtered is guided on spiral paths. The spiral filter includes a filter set comprising two end plates, at least one spiral plate, and at least two support plates with accompanying filter plates. The filter set lies between two pressure plates wherein an axial-acting central compressive force presses the plates together. The spiral plate is plane machined with a high quality finish and has impressed upon each surface at least one turn of a spiral groove. The spiral groove exhibits an approximately semicircular cross-section wherein the turns of the groove are separated by a spiral ridge. The spiral ridge exhibits rounded edges. The grooves on each side of the spiral plate exhibit the same helicity. Within the center of the spiral plate on each side is a circular recess impressed into the center of the surface; the circular recess is connected to the inner end of the spiral groove by a hole which proceeds below the surface of the spiral plate and opens both into the groove and into the recess in a substantially tangential manner. The two outside ends of the grooves on each surface of the spiral plate are connected by a channel proceeding at a dihedral angle relative to the plane of the spiral plate. Each spiral plate is positioned and aligned within the frame of the filtering device with two pins connected on opposite sides of the spiral plate. The end plates abut the spiral plate alignment. On the inside surfaces of both end plates is impressed a groove and recess similar to that which is impressed upon the spiral plate. A channel that serves for inserting a material to be filtered into the filtering device opens tangentially into the outer end of the groove on the end plate. A second channel that serves for the discharge of the retained material opens substantially tangentially into the recess of the end plate. The end plate has a third channel for the discharge of the filtered fluid after filtration.

The support plates with their associated filter plates are inserted between the end plates and the spiral plates and between abutting spiral plates. The filter plates are folded in a U-shaped manner and placed over the support plates to cover both surfaces thereof. The support plates each comprise an essentially square frame composed of a material impermeable to the material being filtered from the filtered fluid. Within the frame of each support plate and in molded engagement therewith is located a circular disk of a porous material. The disk is circular and is of approximately the size of the surface of the spiral plate on which fluid travels in the spiral groove. Within the disk and in molded engagement therewith is located a center ring comprised of a material similar to that of the frame. The center ring exhibits a central hole having a diameter equal to the diameter of the recess of the spiral plate. Each support plate also bears a hole which is in alignment with the third channel of the end plate.

The filter plate, which is placed across either side of each spiral plate, comprises a rectangular piece of porous filter medium. The size of the filter plate is essentially a double-square, each square being approximately the size of a filter plate. Each filter plate has two circular holes each of diameter of the recesses of the spiral plates and two circular holes each of diameter of the third channel of the end plates for the discharge of the filtered fluid after filtration. The double-square piece of porous filter medium is folded in a U-shape with the leg distance having the length of the support plate. In this manner, each leg of the U-shape is placed across a side of the spiral plate.

In another aspect, the present invention is a filtering device having a means for the production of a compressive force upon the filter set. Such means may include a screw, a thread provided upon one end piece for receipt of the screw, and a hand wheel for turning the screw. An alternative means for the production of the compressive force comprises a hydraulic press.

In another alternative, the present invention is a filtering device having a means for the production of a compressive force, wherein such means comprises an alternative end plate which is larger in diameter than the spiral plate. A channel passing through the alternative end plate opens tangentially into the outer end of the groove of the end plate. The device also includes a pressure plate bearing a cylindrical recess having a diameter equal to the diameter of the alternative end plate. The alternative end plate is disposed within the cylindrical recess of the pressure plate. The alternative end plate is sealed against the recess in the pressure plate by an O-ring. The pressure plate has a channel through which the material being filtered is fed into the cylindrical recess in a void between the alternative end plate and the pressure plate. The material being filtered is then passed through a hole in the alternative end plate to the filter set. At least three spring elements are installed within the cylindrical recess between the alternative end plate and the pressure plate. The spring elements produce a minimal compressive force on the filter set before a hydrostatic pressure is effected through a buildup in the void between the alternative end plate and the pressure plate of the material being filtered.

BRIEF DESCRIPTION OF THE DRAWINGS

The invention may be better understood, and its numerous features and advantages will be apparent to those skilled in the art, by reference to the accompanying drawings in which:

FIG. 3a is a top view of the support plate for the filter medium;

FIG. 3b is a cross-sectional side view of the support plate of FIG. 3a;

DETAILED DESCRIPTION OF THE INVENTION

Figure 1:
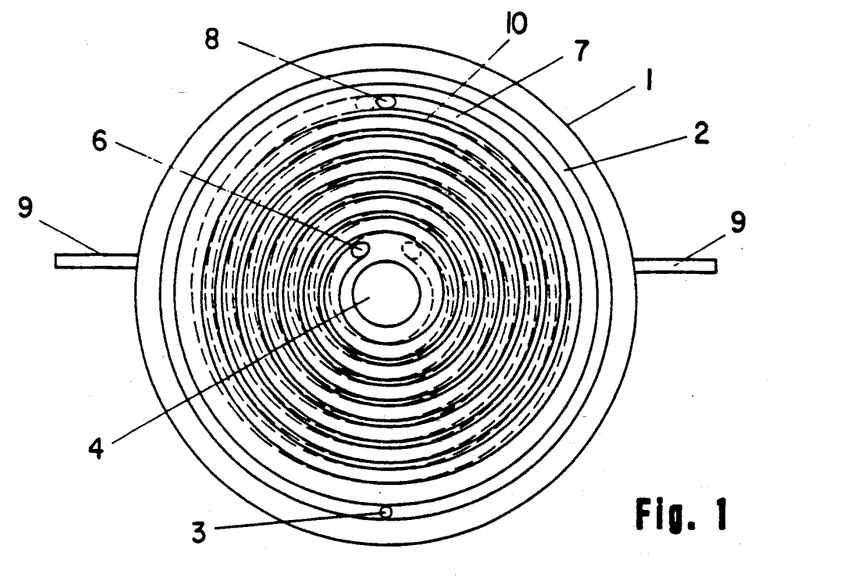
FIG. 1 is a top view of a spiral plate constructed in accordance with the teachings of the present invention.
Figure 2A:
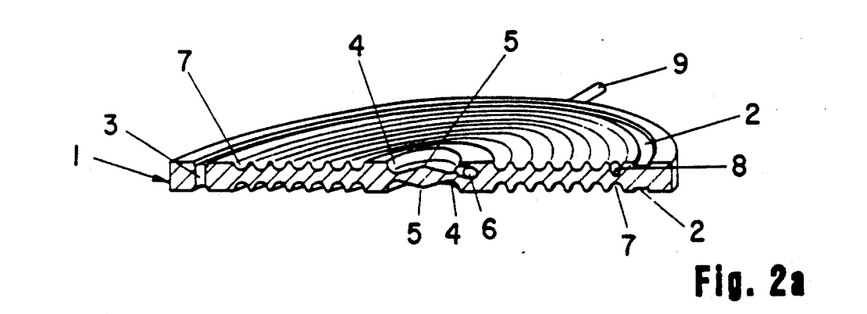
FIG. 2a illustrates a cross-sectional side view of the spiral plate of FIG. 1.
Figure 2B:
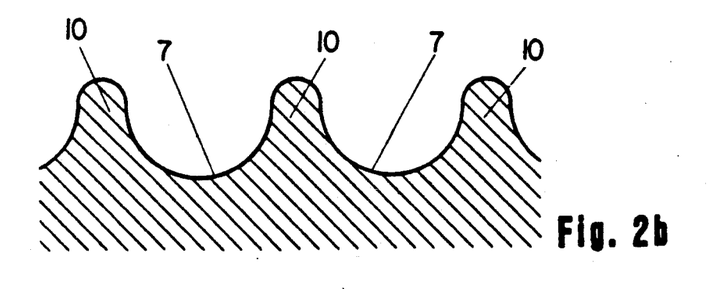
FIG. 2b illustrates a cross-sectional side view of the spiral-shaped grooves of the spiral plate.

Referring first to FIGS. 1, 2a and 2b, a spiral plate 1, constructed in accordance with the teachings of the present invention, has an annular channel 2 formed on either side of the spiral plate 1. Each annular channel 2 serves for withdrawal of the filtered fluid after it has permeated through the spiral groove 7 on the particular side of the spiral plate 1. The annular channels 2 on either side of the spiral plate 1 are connected by a channel hole 3. A circular recess 4 is formed within the center of each side of the spiral plate 1. The bottom portion 5 of the circular recess 4 on either side of the spiral plate 1 has a convex shape similar to the bottom of a bottle. The shape of this bottom portion 5 can be optimized for the particular medium being filtered or for the flow velocity of the filtered medium. A hole 6 leads out from each side of the recess 4 to a spiral-shaped groove 7 encircled on the side of the spiral plate 1 where the hole 6 is located. Each hole 6 opens both into the respective groove 7 and the recess 4 in an essentially tangential manner. During the filtration process, filtered medium enters the hole 6 from the recess 4 and flows through the spiral groove 7 encircling the spiral plate 1. The filtered medium passes from the innermost portion of the spiral groove, through the spiral groove 7, to the outermost portion of the spiral groove 7, which spiral groove 7 totals one or several, for example, seven, encirclements on each side of the plate 1. The spiral groove 7 may cause the filtered medium to flow clockwise or counter-clockwise, with the spiral groove 7 on the other side of the plate 1, causing flow in the opposite rotational direction. The outermost length of the spiral groove 7 ends with an exit channel 8 which connects the groove 7 on the frontside with the corresponding groove 7 on the reverse side of the spiral plate 1. Exit channel 8 is inclined in a dihedral angle compared to the plane of the spiral plate 1. If, for example, the flow of the fluid being filtered begins in recess 4, and moves to the outside edge of the spiral plate 1 in a clockwise spiral direction through spiral groove 7, the filtered fluid is, introduced, at the outermost end of spiral groove 7, through exit channel 8 to the other side of spiral plate 1 without any substantial change in direction of flow of the filtered fluid because of the dihedral angle of exit channel 8.

On such other side of the spiral plate 1, the filtered fluid flows towards the inside of the spiral plate 1 along the groove 7 in the same rotational direction but inward towards the recess 4 due to the opposing configuration of the spiral groove 7 thereon. When the surface of the spiral plate 1 is observed on both sides, the groove 7 shows the same spiral of direction or the same helicity. Formation of each such respective groove 7 and exit channel 8 in such manner prevents substantial changes in the direction of fluid flow as the filtered fluid passes through the groove 7 on one side of the plate 1, through exit channel 8, and to and through the groove 7 on the other side of the plate 1. By preventing substantial change in the direction of fluid flow, the device limits the flow resistance and build-up of longitudinal pressure within the fluid.

Figure 5:
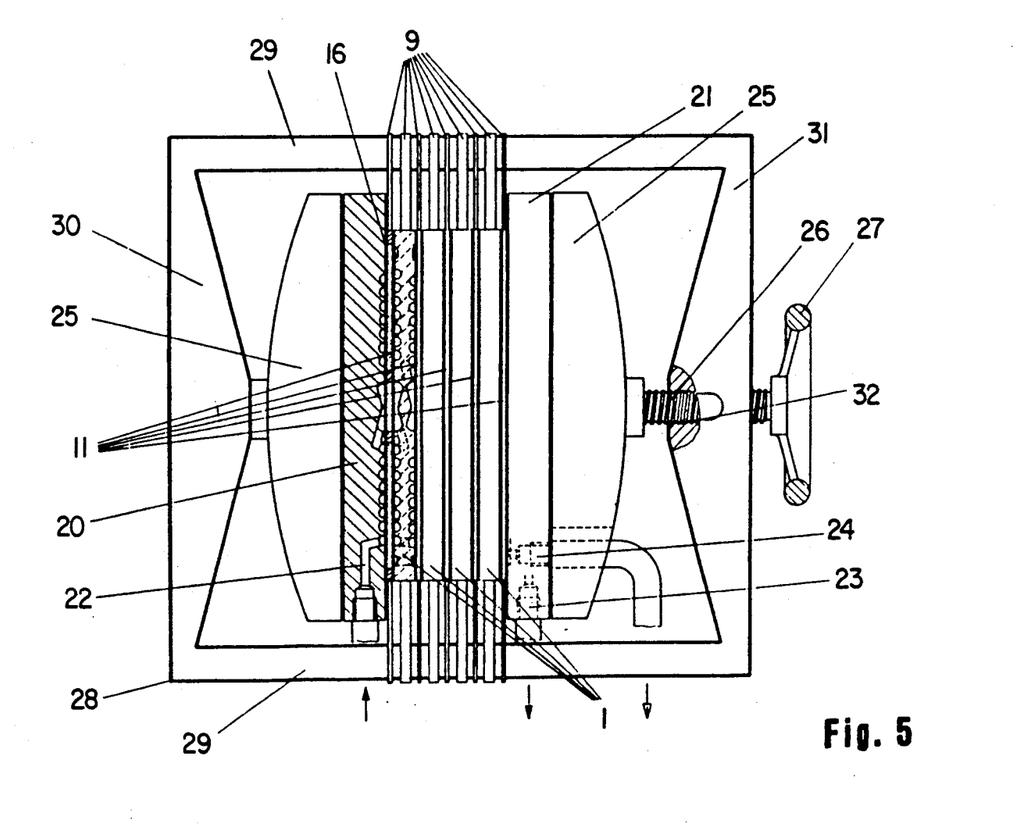
FIG. 5 is a partial cross-section through a filtering device comprising several filter plates.

On the outer edge of the spiral plate 1, two pins 9 are positioned which serve to facilitate the assembly and proper alignment of the spiral filter, as shown in FIG. 5. The pins 9 are of an elongated form possessing milled slots, or alternatively, having a curved design.

Referring next to FIG. 2b, there is shown in a partial cross-section of the spiral plate 1 depicted in FIG. 2a. Groove 7 has an approximately semicircular cross-sectional form. The individual valleys of groove 7 are separated by a spiral ridge 10 with a rounded upper edge. The ridge 10 may have a relatively narrow construction since pressure forces only act upon it perpendicularly and originate from the pressure drop per turn of groove 7. Maximum utilization and efficiency of the filter surface is achieved if the ridge 10 is more narrowly constructed since more surface area will be exposed to the fluid. The rounding of the ridge 10 helps to prevent any damage to filter medium disposed on the plate 1.

Both surfaces of the spiral plate 1, including its annular channel 2, channel hole 3, recess 4 and groove 7, are machined with a high degree of surface quality. Three flat circular rings are formed upon both surfaces of the spiral plate 1; one of the flat rings is disposed between the outside edge of the spiral plate 1 and channel 2, the second flat ring is disposed between the channel 2 and the outermost turn of groove 7, and the last flat ring is disposed between the innermost turn of groove 7 and recess 4. These three flat circular rings act as sealing surfaces to retain the fluid within the grooves, channels and recesses when several spiral plates 1 are positioned together forming the spiral filter assembly.

Figures 3A, 3B:
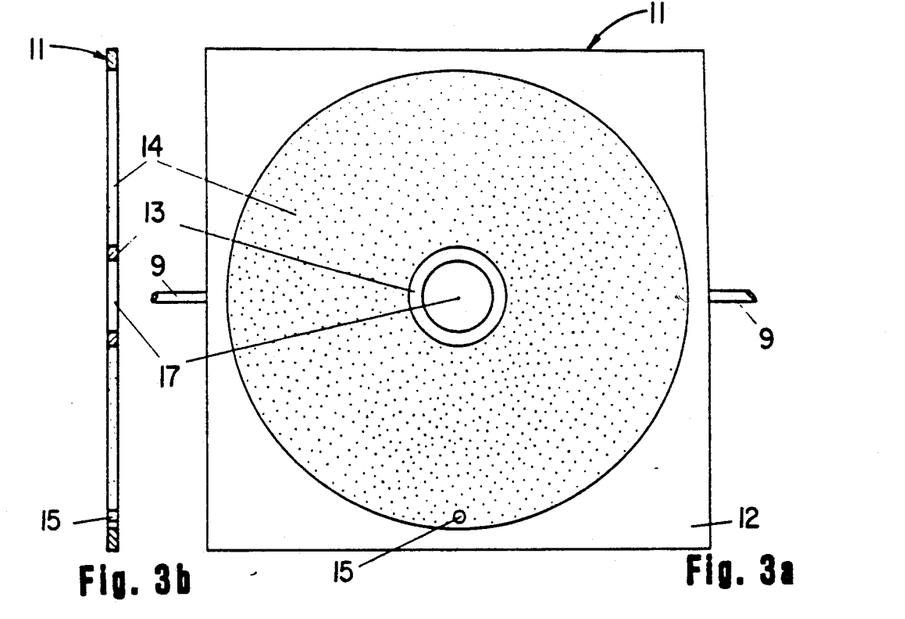

Referring to FIG. 3a, there is shown a top view of an exemplary support plate 11; a cross-section of support plate 11 is illustrated in FIG. 3b. The support plate 11 is composed of essentially three parts: a substantially square frame 12, a center ring 13 with a hole 17, and a disk 14 of a porous material. Possible porous materials include, for example, ceramics, sintered metal, activated carbon, fritted glass and other materials pervious to the filtered fluid. Alternatively, the porous materials may be composed of any composite materials which support the filtered material appropriately and yet allow no change in thickness of the material under the influence of operating pressures. The center ring 13 and the frame 12 are impermeable to the material being filtered and may consist of a chemically inert plastic, such as polysulfone, since the frame is less stressed mechanically in the apparatus. The three parts, the square frame 12, the center ring 13 and the disk 14, are pressed or molded together. The disk 14 has a larger diameter than channel 2 in the spiral plate 1 and bears a hole 15 which is aligned with the channel hole 3 of the spiral plate 1 during assembly of the device. The filtered fluid is discharged through hole 15.

Figure 3C:
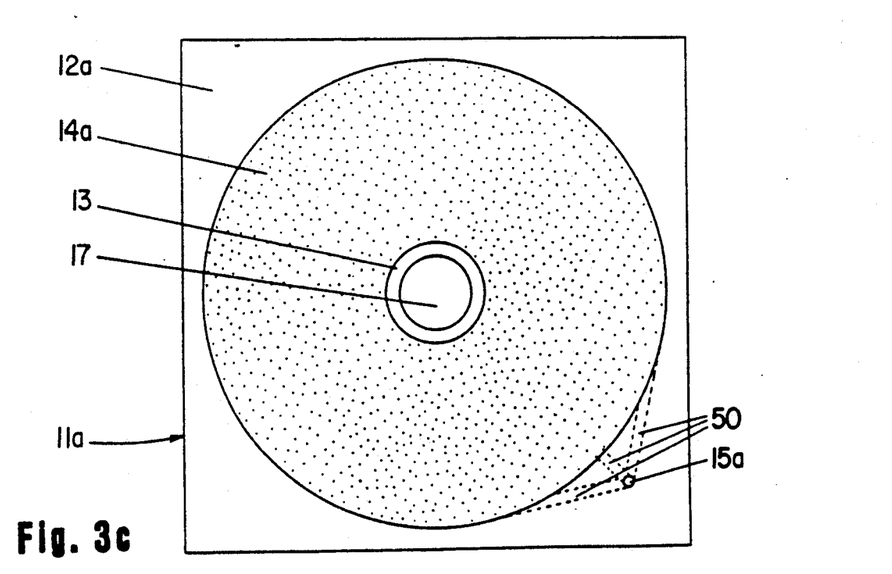
FIG. 3c illustrates an alternative embodiment of a support plate.

An alternative embodiment of the support plate 11a is illustrated in FIG. 3c. Here, hole 15a is not in disk 14a, but rather is introduced into frame 12a. For example, in frame 12a, three fluid channels 50, the axes of which lie parallel to the plane of the frame 12a, run from hole 15a to disk 14a. The filtered fluid is collected in the three fluid channels 50 where it is transmitted to hole 15a for passage out of the filter device.

Another alternative embodiment of the support plate 11b (not shown) bears two holes 15b proceeding from two fluid channels 50b. The two holes 15b are symmetrical about the center of the disk 14b.

Both support plates 11 and support plate 11a in FIGS. 3a and 3c, respectively, possess pins 9, such as those disposed upon spiral plate 1, for their assembly and proper alignment within the filter device.

An alternative embodiment of spiral plate 1 corresponding to the alternative embodiment of support plate 11a illustrated in FIG. 3c does not contain an annular channel 2 since the function of such channel 2, the collection of the filtered fluid, is accomplished by the channels 50.

If the support plate 11b (not shown) contains two holes 15b, then two holes 3b will be provided in spiral plate 1 to align with the two holes 15b.

Figure 4:
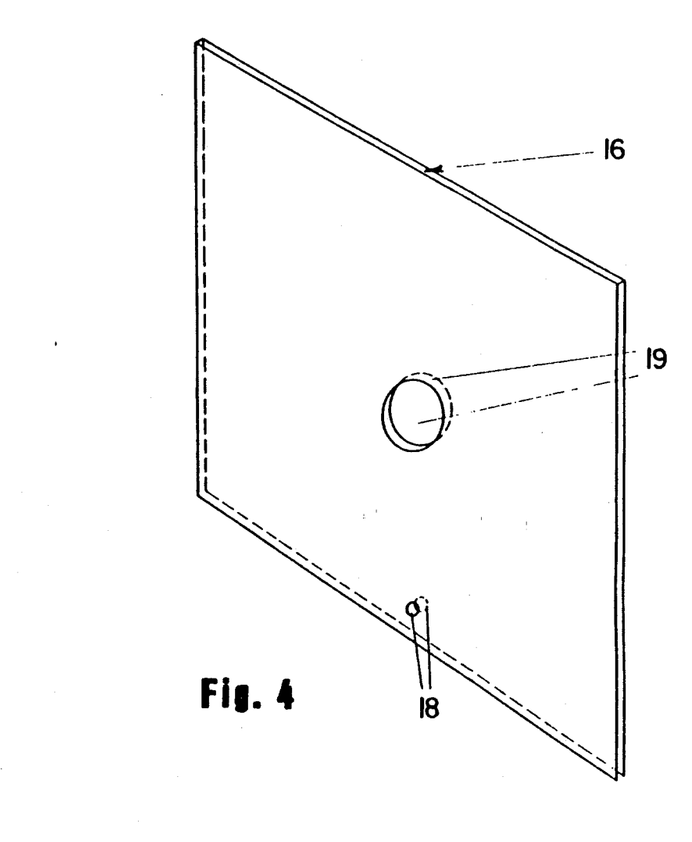
FIG. 4 is a perspective view of the filter medium.

Referring now to FIG. 4, there is shown a filter plate 16, a rectangular piece of which is folded in a double-square format to a U-shape configuration for mounting over support plate 11. None of the sealing surfaces are covered. The spacing of the two parallel sides of the U-shape corresponds to the thickness of the support plate 11 and during mounting such parallel sides are disposed across either side of the support plate 11. Four holes 18, 19, for example, are stamped into the filter plate 16; holes 19 have the same diameter as recess 4 in spiral plate 1; holes 18 have the same diameters as channel hole 3 and hole 15. In the folded state, holes 19 lie on the recess 4 and holes 18 lie on channel hole 3 and hole 15, respectively.

Referring to FIG. 5, a spiral filtering device is depicted in its assembled state. In this embodiment, four spiral plates 1 with five support plates 11 are inserted between two end plates 20, 21. Since each support plate 11 bears a U-shaped filter plate 16, a total of ten filtering surfaces are present. On the surfaces of the two end plates 20, 21 facing towards the group of filters, grooves are constructed to correspond with those on each abutting spiral plate 1. The end plate 20 is formed with a feed channel 22 through which the material being filtered is fed. The feed channel 22 on the side turned toward filter plate 16 is constructed to correspond with exit channel 8 in the spiral plate 1. The end plate 21 possesses two channels, a filtrate channel 23 and a permeate channel 24. The filtrate channel 23 discharges the retained material, or concentrate, to the outside. The permeate channel 24 discharges the filtered medium to the outside. The filtrate channel 23 is constructed to correspond with exit channel 8 on the surface of the abutting spiral plate 1 facing toward filter plate 16. The permeate channel 24 aligns with channel hole 3 in spiral plate 1 abutting the end plate 21 and filter hole 18 in filter plate 16 adjacent thereto. The filtered fluid after filtration through the device flows out from the permeate channel 24.

The filter set, consisting of the numbers of spiral plates 1, support plates 11 and filter plates 16, is installed between end plates, a top end plate 20 and a bottom end plate 21. Each end plate has a groove and recess therein which matches with the spiral groove 7 and circular recess 4, respectively, of an adjacent spiral plate 1 employed with the filter assembly. Two pressure plates 25 act upon the top end plates 20 and the bottom end plate 21, respectively. The pressure plates 25, spiral plates 1, support plates 11, and filter plates 16 assembly is impinged centrally by a compressive force actuated by a screw 26 with hand wheel 27. The assembly is disposed within a frame 28, comprising, for example, two draw bars 29 and two end pieces, a top end piece 30 and a bottom end piece 31. The bottom end piece 31 possesses a thread 32 for receipt of screw 26. In an alternative embodiment, a hydraulic press can be used in place of a screw 26 with hand wheel 27. Both draw bars 29 serve simultaneously as bearing surfaces for the pins 9 on the spiral plates 1 and support plates 11 by which proper alignment of the spiral plates 1 and support plates 11 is insured. This also insures that channel hole 3 and hole 15 are properly aligned.

Figure 6:
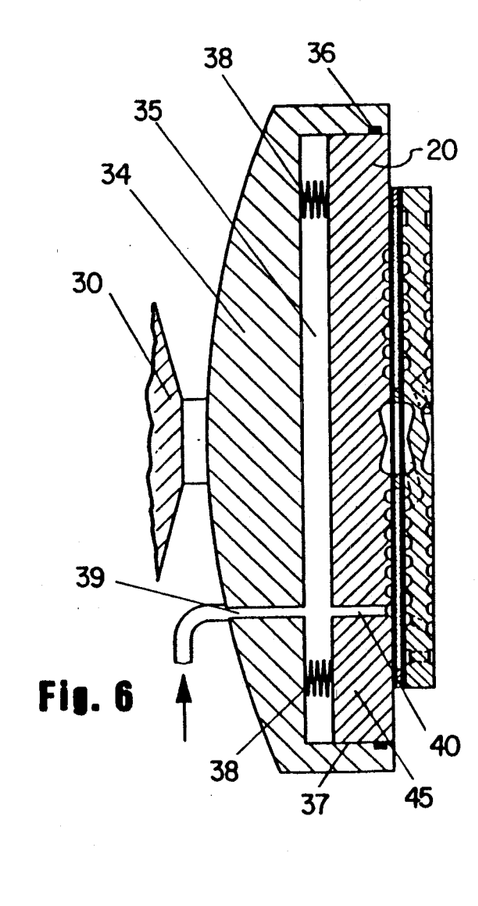
FIG. 6 is a cross-section of an alternative embodiment of the filtering device.

Referring to FIG. 6, a section of an alternative embodiment of the spiral filter of FIG. 5 is shown. An alternative end plate 45 is used in place of a top end plate 20 and is designed larger than the top end plate 20. An alternative pressure plate 34, which is supported on the end piece 30 of frame 28, exhibits a cylindrical recess 35 which is sealed against the cylindrical outside surface of end plate 45, for example, by an O-ring 36. A plurality of spring elements 38, for example coil springs, are installed in the recess 35.

Initially, the material being filtered is pressed through a channel 39 into the recess 35 before it enters an entry channel 40 (replacing channel 22 of FIG. 5) in alternative end plate 45. The pressure of the material being filtered produces a compressive force upon the surface of the alternative end plate 45, thus compressing the filter set together. This force is always greater than the hydrostatic opposing force spontaneously produced within the filter set. The spring elements 38 produce a minimal initial force that is subsequently replaced by the hydrostatic forces.

Figure 7A:
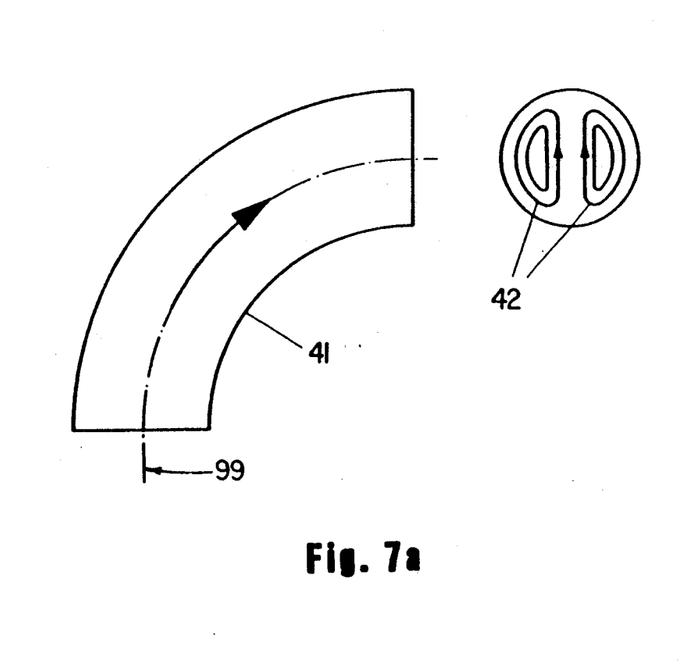
FIG. 7a illustrates fluid flow characteristics through a curved pipe.
Figure 7B:
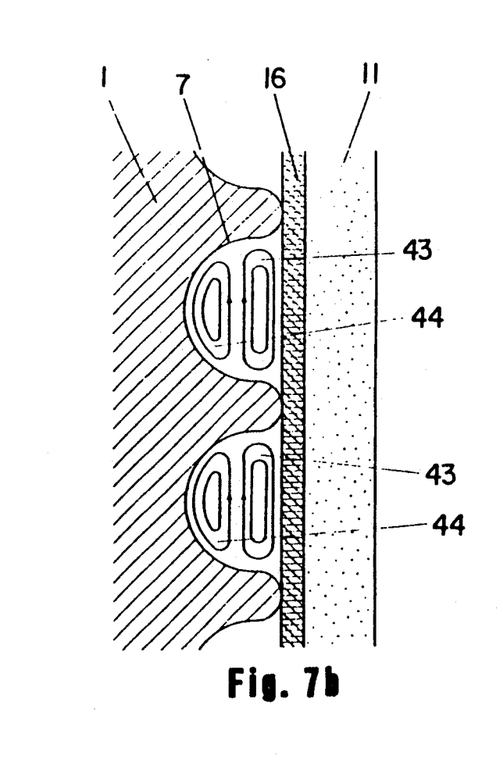
FIG. 7b illustrates fluid flow characteristics within the filtering device constructed in accordance with the teachings of the present invention.

Referring next to FIGS. 7a and 7b, the advantages of the present invention over the prior art are exemplified. In FIG. 7a, the flow distribution of a fluid through a curved pipe 41 is shown. The distribution of velocity as a function of the distance from the pipe axis 99 creates a dual rotational flow across the cross-section of the pipe 41 with opposing rotations. Vectorial addition of both velocity distributions results in such a double-screw flow of the fluid. In FIG. 7b, the flow distribution is shown through the spiral groove 7 of FIG. 2b. As illustrated, the flow within the spiral groove is similar to that within the curved pipe 41. Two oppositely rotational flow spirals, a clockwise flow spiral 43 and a counter-clockwise flow spiral 44 result. The clockwise flow spiral 43 moves past filter plate 16 in such spiral and the counter-clockwise flow spiral 44 approximately remains within the semicircular groove 7 and abuts the filter plate 16. As the fluid passes from one side of the spiral plate 1 to the other, the two flow spirals 43, 44 reverse direction in relation to the plate 1 and filter plate 16. A certain amount of mixing of the filtered fluid occurs both during movement through the groove 7 and while flowing through exit channel 8 (shown in FIGS. 1 and 2a). Most mixing occurs while the fluid is flowing through the recess 4 (shown in FIGS. 1 and 2a) formed between two spiral plates 1 when positioned toward one another. Such mixing insures that varying compositions of flow spirals of the fluid contact the filter plate 16 during the process.

The filtering device in accordance with the teachings of the present invention is of particular interest in the fields of ultrafiltration and reverse osmosis, however, it is not limited to those areas. By varying the dimensions and characteristics of the parts of the device which enable flow therethrough, the optimum porosity of the support plates 11, the flow velocities, and/or the operating pressures, the device can be used universally in the filtration of aerosols, gaseous suspensions and the whole range of filtrations of liquid media. Obviously, such a device may be uniquely configured for an optimal operating range for a particular use of a particular fluid.

Backflushing of the spiral filter is accomplished by a pressure reversal of the operating pressure with an unaltered flow direction and pressure. Backflushing requires the existence the actual operating pressure which is built up by one of two pressure systems: (i) a simple piston pressure or gas pressure cushion for batch operation or (ii) a high pressure metering pump for continuous operation. The pressure systems also should be constructed to produce a flow along the spiral paths of the apparatus. Such use to produce a flow along the spiral paths requires only that the system be sufficient to account for hydrodynamic pressure drop.

The filtering device in accordance with the teachings of the present invention is suitable for parallel and series operation in accordance with the multiple spiral plate 1, support plate 11, filter plate 16 assembly of FIGS. 5 or 6 or as a parallel or series configuration of separate structures of frames 28 containing such elements. Series operation may entail a larger number of spiral plates 1 with the associated support plates 11 and filter plates 16 collected into a single filter set in one frame 28 as exemplified in FIGS. 5 or 6. For laboratory operation, a single spiral plate 1 with two support plates 11 and filter plate 16 may be utilized between the top end plate 20 and the bottom end plate 21.

Thus, there has been described and illustrated herein a spiral filter. However, those skilled in the art will recognize that many modifications and variations besides those specifically mentioned may be made in the techniques described herein without departing substantially from the concepts of the present invention. Accordingly, it should be clearly understood that the form of the invention described herein is exemplary only and is not intended as a limitation on the scope of the present invention.

What is claimed is:

1. A filtering device for the filtration of aerosols, gaseous and liquid suspensions, and colloidal or true solutions, wherein the material being filtered is guided on spiral paths, comprising:

at least one spiral plate, having dual surfaces each impressed with at least one turn of a spiral groove, said groove exhibiting an approximately semicircular cross section and having turns separated by a spiral ridge, said ridge exhibiting rounded edges, said grooves on either side of said spiral plate exhibiting the same helicity, said spiral plate impressed with a circular recess into the center of each surface, said circular recess connected to the centermost end of said groove by a hole, said hole proceeding below the surface of said spiral plate and essentially parallel to said surface and opening into said groove and said recess in a substantially tangential manner, outside ends of each of said grooves being connected by a channel proceeding at a dihedral angle relative to the surfaces of said spiral plate, each said spiral plate including a permeate channel extending therethrough, said spiral plate being positioned and aligned within said filtering device by two pins connected to said spiral plate and aligned essentially opposite each other with axes proceeding parallel to the surface of said spiral plate;

end plates disposed on each side of said at least one spiral plate having inner surfaces containing grooves and recesses that match with the spiral grooves and the circular recesses of spiral plates, one of said end plates having a feed channel that serves for inserting a material to be filtered into said filtering device, said feed channel opening tangentially into the outer end of the groove of said end plate, and the other of said end plates having a filtrate channel that serves for discharge of retained material, said filtrate channel opening substantially tangentially into said recess in said end plate, and a permeate channel in alignment with the permeate channels of said spiral plates for the discharge of the filtered fluid; and at least two support plates with filter plates inserted between said end plates and said spiral plates, wherein a respective said filter plate is folded in a U-shaped manner and placed across a respective said support plate covering both surfaces of said support plates, said support plate including an essentially square frame formed of material impermeable to material to be filtered, and having within said frame and in molded engagement therewith a circular disk of a porous material, within said disk and in molded engagement therewith being a center ring formed of material similar to said frame, said center ring exhibiting a central hole of diameter equal to that of the circular recess of said spiral plate, said support plate also having a hole in alignment with said permeate channel of said end plate and the permeate channel of said spiral plates for discharge of filtered fluid, each of said filter plates between said support plates being a rectangular piece of filter medium of essentially double-square format and having two circular holes and locationally oriented with respect to said circular recess of said spiral plate and two circular holes locationally oriented with respect to said permeate channel of said end plate and the permeate channel of said spiral plate for discharge of filtered fluid, said rectangular piece of filter medium being folded in a U-shape with a leg distance having the thickness of said support plate; said at least one spiral plate, said end plates, and said at least two support plates with filter plates together forming a filter set.

2. The filtering device as set forth in claim 1 wherein said filter set lies between two pressure plates suitable for the receipt of an axial acting central compressive force.

3. A filtering device as set forth in claim 1 wherein the permeate channel of each said spiral plate is comprised of a concentric channel impressed upon each surface of said spiral plate, said concentric channel disposed between the edge of said spiral plate and the outermost turn of said groove, said channels being connected through said spiral plate by a channel hole.

4. A filtering device as set forth in claim 1, wherein the permeate channel of each said support plate comprises at least one hole in said frame, and wherein a plurality of fluid channels extend within said frame from said disk to said at least one hole for passage of filtered fluid therethrough.

5. A filtering device as set forth in claim 1 comprising one of said spiral plates.

6. A filtering device as set forth in claim 1 comprising a plurality of said spiral plates.

7. A filtering device as set forth in claims 1 or 4 further comprising a frame for installation therein of said filter set, said frame having at least two draw bars, said draw bars providing bearing surfaces for said pins of said spiral plates, and at least two end pieces, one of said end pieces including a means for providing compressive force on said filter set.

8. A filtering device as set forth in claim 5 wherein said means for providing compressive force upon said filter set includes:
a screw;
a thread provided on said one end piece for receipt of said screw; and
a hand wheel for turning said screw.

9. A filtering device as set forth in claim 5 wherein said means for providing compressive force is a hydraulic press.

10. A filtering device as set forth in claim 1 wherein one of said end plates is larger in diameter than said other end plate and said spiral plate, an entry channel passing through said one end plate and opening tangentially into a groove on said one end plate;

pressure plate having a cylindrical recess with a diameter corresponding to an outer diameter of said one end plate, said one end plate being disposed within said cylindrical recess and sealed thereagainst by an O-ring, said pressure plate also having a channel through which material being filtered is fed into said cylindrical recess and passed through said entry channel in said one end plate into said filter set; and at least one spring element positioned within said cylindrical recess between said one end plate and said pressure plate for producing a minimal compressive force on said filter set before hydrostatic pressure, effected through buildup of material being filtered, causes said one end plate to forcefully press against said filter set.

11. A filtering device as set forth in claim 1 wherein said disk is comprised of sintered metal.

12. A filtering device as set forth in claim 1 wherein said disk is comprised of activated carbon.

13. A filtering device as set forth in claim 1 wherein said disk is comprised of fritted glass.

14. A filtering device as set forth in claim 1 wherein said disk is further comprised of ceramic.

15. A filtering device as set forth in claim 1 wherein said disk is further comprised of composite material.

* * * * *

UNITED STATES PATENT AND TRADEMARK OFFICE
CERTIFICATE OF CORRECTION

PATENT NO. : 5,240,605
DATED : August 31, 1993
INVENTOR(S) : Heinz B. Winzeler

It is certified that error appears in the above-identified patent and that said Letters Patent is hereby corrected as shown below:

Column 4, line 38:   Delete "is,"; insert "is"

Column 6, line 14:   Delete "diameters"; insert "diameter"

Column 7, line 63:   Delete "existence the"; insert "existence of the"

Signed and Sealed this

Fourteenth Day of June, 1994

Attest:

*Attesting Officer*

BRUCE LEHMAN

*Commissioner of Patents and Trademarks*